UNITED STATES PATENT OFFICE.

HERMANN von KÉLER AND ANTON WEINDEL, OF LEVERKUSEN, NEAR COLOGNE, GERMANY, ASSIGNORS, BY MESNE ASSIGNMENTS, TO GENERAL CHEMICAL COMPANY, OF NEW YORK, N. Y., A CORPORATION OF NEW YORK.

CATALYTIC OR CONTACT AGENT.

1,183,414.  Specification of Letters Patent.  Patented May 16, 1916.

No Drawing. Original application filed June 23, 1913, Serial No. 775,363. Divided and this application filed January 16, 1914. Serial No. 812,440.

*To all whom it may concern:*

Be it known that we, HERMANN VON KÉLER and ANTON WEINDEL, doctors of philosophy, chemists, citizens of the German Empire, residing at Leverkusen, near Cologne-on-the-Rhine, Germany, have invented new and useful Improvements in a Catalytic or Contact Agent, of which the following is a specification.

This invention relates to a new catalytic or contact agent; and it comprises a new catalytic agent containing silver and vanadium in the form of a silver-vanadium compound, and more particularly in the form of silver vanadate.

It also comprises such a catalytic distributed upon a suitable carrying base and more specifically it comprises as such a catalytic or contact substance silver meta-vanadate precipitated upon asbestos or other suitable base; and it further comprises certain novel features of the contact material; all as more fully hereinafter set forth and as claimed.

This application is a division of our application which has become Patent No. 1,102,670, dated July 7, 1914, in which we describe and claim processes carried out with these specific catalytic agents.

We have discovered, that compounds of silver and vanadium, such as silver vanadate, form valuable catalytic or contact substances for contact processes, and particularly for use in the $SO_3$ contact process, almost complete oxidation of the $SO_2$ being obtainable by the use of such catalytics. In using the catalytic it may be conveniently distributed upon a suitable base such as asbestos. Various means of accomplishing this distribution may be employed. For example the contact support such as asbestos may be impregnated with a solution of a suitable vanadium compound such as ammonium meta-vanadate and the asbestos after being thus treated and impregnated may then be treated with a solution of silver nitrate or other soluble silver salt to precipitate the silver vanadium compound, such as silver meta-vanadate.

The amount of the compound which is used can be varied and also the relative amount of the compound precipitated or otherwise distributed upon the asbestos or other base. In the conversion of a mixture of sulfur dioxid and oxygen into sulfur trioxid by the contact process, using silver-vanadate as a catalytic, an amount of this compound equal to about 20 per cent. of the amount of the asbestos support gives good results.

We claim:—

1. A new catalytic agent comprising a silver-vanadium compound distributed upon a suitable carrying base.

2. A new catalytic agent comprising a silver-vanadium compound distributed upon asbestos.

3. A new catalytic agent comprising a silver-vanadium compound in the form of silver vanadate distributed upon a suitable carrying base.

4. A new catalytic agent comprising a silver-vanadium compound in the form of silver vanadate distributed upon asbestos.

5. A new catalytic agent comprising a silver-vanadium compound in the form of silver meta-vanadate distributed upon a suitable carrying base.

6. A new catalytic agent comprising a silver-vanadium compound in the form of silver meta-vanadate distributed upon asbestos.

7. A new catalytic agent comprising a carrying base impregnated with a silver-vanadium compound precipitated upon said base.

8. A new catalytic agent comprising asbestos impregnated with a silver-vanadium compound precipitated upon said asbestos.

In testimony whereof we have hereunto set our hands in the presence of two subscribing witnesses.

HERMANN von KÉLER.
ANTON WEINDEL.

Witnesses:
HANS BRUCKNER,
CHRISTIAN HANSEN.